Oct. 17, 1961  T. E. LENIGAN  3,005,165
PULSE POSITION ERROR DETECTOR
Filed Aug. 31, 1960  2 Sheets-Sheet 2
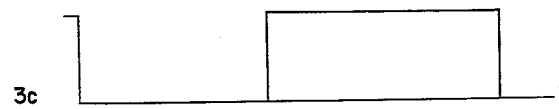
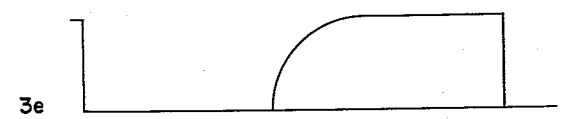
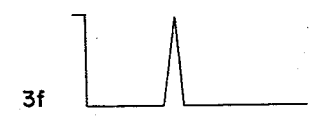
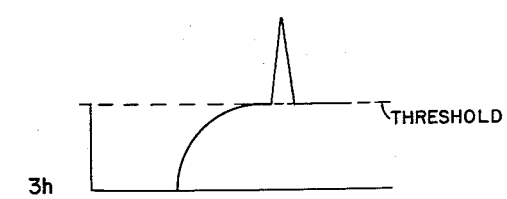
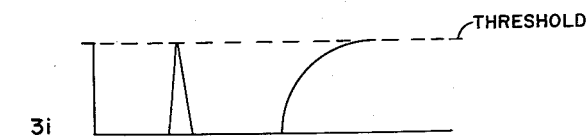
FIG. 3
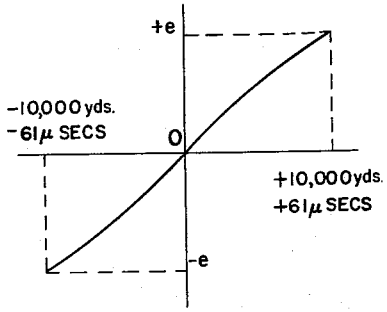
FIG. 4
Thomas E. Lenigan,
INVENTOR.
BY
ATTORNEYS

United States Patent Office 3,005,165
Patented Oct. 17, 1961

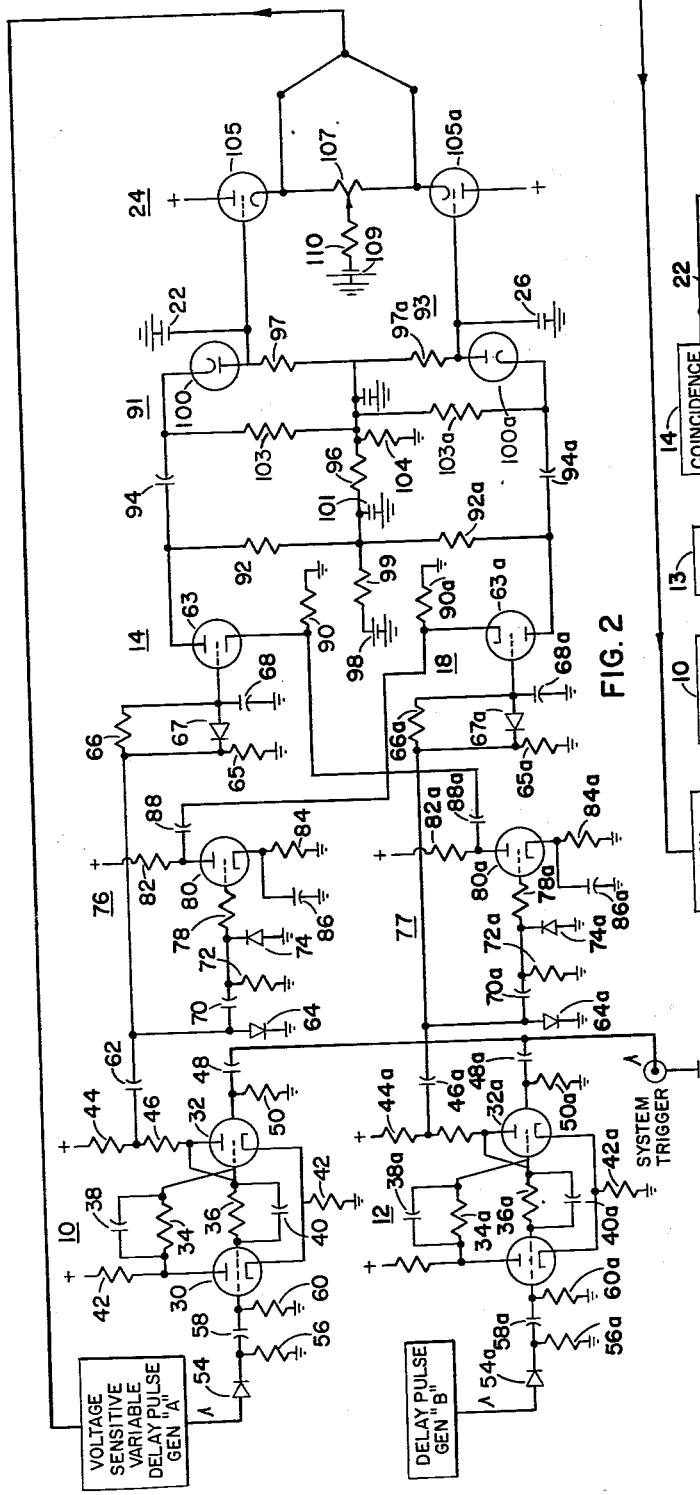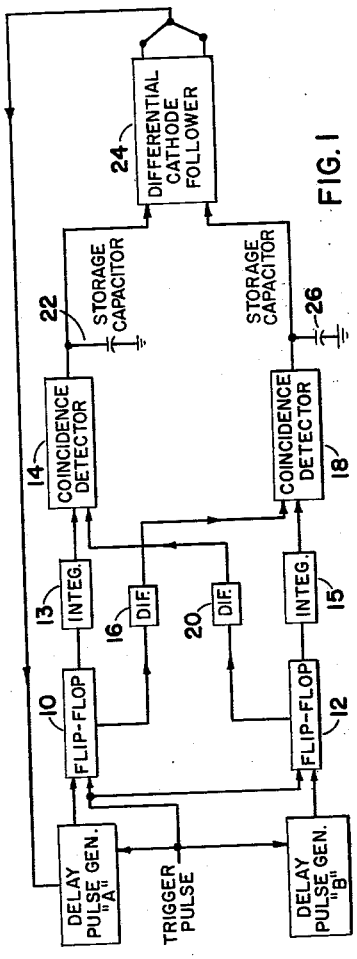

3,005,165
PULSE POSITION ERROR DETECTOR
Thomas E. Lenigan, Morristown, N.J., assignor, by mesne assignments, to the United States of America as represented by the Secretary of the Army
Filed Aug. 31, 1960, Ser. No. 53,322
2 Claims. (Cl. 331—11)

This invention relates to pulse generating systems and particularly to a method and means of synchronizing two such systems.

There is a need in some pulse positioning applications for a means of automatically placing a pulse whose position is variable with time into coincidence with a second pulse whose position is also variable with respect to time. As an example, we may have two radar range units each of which measures distance to a target in terms of elapsed time between an initial pulse representing the instant of transmission of a signal from the radar transmitter and a second pulse which is placed in coincidence with the returned signal from the target. In transferring target information from one radar to the other, the range gating pulse of the second radar, which may be occurring either earlier or later, must be positioned for the same target that has been selected by the first range unit.

In the past, this has been accomplished by deriving an on-off error voltage of a polarity determined by the relative time position of the two pulses such as to drive the tracking range unit pulse toward the acquisition range pulse. On arriving at this position the track range unit will oscillate about the correct position. The operator then has to take control and manually position the tracking unit. The method has many disadvantages, particularly it may not be used when the radars are remote from one another.

It is an object of the present invention to provide an all electronic means for indicating the sense and magnitude of the pulse separation of two systems which may be readily employed to control one of the systems to obtain synchronization with the other.

To examine the invention basically, assume that there exists two delay type pulse generating systems which are synchronously triggered by an externally produced reference pulse. Each of these systems then emit a delayed pulse at some determinable time after the reference trigger pulse. Finally, assume that with respect to at least one of the systems, say a first of the systems, the period of delay is variable and responsive to an electrical signal, one polarity of signal causing the delay to increase and the other causing it to decrease. Given the problem of synchronizing the delayed pulses of the first generating system with the delayed pulses of the other, second, generating system the present invention contributes a pulse position error detector (difference in pulse position) which supplies the requisite signal to vary the time position of the delayed pulses of the first system to produce the desired alignment.

In accordance with the invention means are provided to develop a pulse $a$ of a duration equal to the interval between a delayed pulse of a first generating system and the next occurring trigger pulse, and a pulse $b$ of a duration equal to the interval between the delayed pulse of a second generating system and the next occurring trigger pulse. A first coincidence circuit is arranged to provide an output responsive to the coincidence of the delayed pulse or function thereof, of the first generating system and pulse $b$; and a second coincidence circuit is arranged to provide an output responsive to the delayed pulse, or function thereof, of the second generating system and pulse $a$. The outputs of the coincidence circuits are integrated and differentially combined to provide a D.C. error voltage which will provide a control signal which will drive one of the generating systems to cause coincidence in the "delayed" pulses.

The objects and features of the invention will become more apparent by reference to the following description and drawings in which:

FIGURE 1 is a block diagram of an embodiment of the invention;

FIGURE 2 is a schematic circuit diagram of an embodiment of the invention;

FIGURES 3 and 4 show various graphs illustrating the operation of the invention.

Referring now to FIGURE 1, there is shown delay type pulse generators "A" and "B" which are driven with a trigger or reference pulse and which include means for producing a pulse at some point in time between reference pulses. Pulse generator "A" provides variable delay means such as an electrically driven adjustable phase shifter responsive to a voltage, for adjusting this time of occurrence. The output of generator "A" is fed to an input of bistable multivibrator or flip-flop 10 and the output of generator "B" is fed to an input of flip-flop 12. The reference or trigger pulse is also applied to an input of each flip-flop to produce a conduction state in each of the flip-flops opposite to that produced by an output of one of the generators. The output of flip-flop 10 is fed through circuit 13 to coincidence detector 14 and, through differentiating circuit 16, to coincidence detector 18. The output of flip-flop 12 is fed through integrating circuit 15 to coincidence detector 18 and through differentiating circuit 20 to coincidence detector 14. The output of coincidence detector 14 is integrated by capacitor 22 and applied to one input of differential cathode follower amplifier 24 and the output of coincidence detector 18 is integrated by capacitor 26 and fed to the other input of differential amplifier 24. The differential output of amplifier 24 indicates the sense and is proportional to the magnitude of the time difference between the output of pulse generator "A" and pulse generator "B." This output is fed to a control input of generator "A" to appropriately cause the output of generator "A" to advance or retard to produce coincidence with the output of generator "B."

To further examine the operation of the circuit of FIGURE 1, reference is made to FIGURE 3. FIGURE 3a illustrates the occurrence of the trigger pulse and the output pulses $a$ and $b$ of generators "A" and "B," respectively. Assume as shown, neither generator "A" nor "B" is being controlled by the output of differential amplifier 24 and $a$ and $b$ occur independently. Pulse $a$ is applied to flip-flop 10 and the rectangular wave shown in FIGURE 3b occurs, pulse $a$ causing the rise portion of the waveform and the trigger pulse causing the fall portion, as indicated by the time coincidence with FIGURE 3a. In a similar manner pulse $b$ and the trigger pulse applied to flip-flop 12 produce at the output of flip-flop 12 the rectangular waveform shown in FIGURE 3c. An output of flip-flop 10 is partially integrated by integrator 13 to provide a gradual rise, one with a decreasing slope, to the leading edge. This modified waveform, shown in FIGURE 3d, is applied to an input of coincidence detector 14. Similarly an output of flip-flop 12 is partially integrated by integrator 15 to provide a gradual rise with a decreasing slope. This modified waveform, shown in FIGURE 3e, is applied to an input of coincidence circuit 18. An output of flip-flop 10, as differentiated in differentiator 16 and illustrated in FIGURE 3f, is applied to an input of coincidence detector 18. Similarly an output of flip-flop 12, as differentiated in differentiator 20 and illustrated in FIGURE 3g, is applied to coincidence circuit 14. FIGURE 3h illustrates by a dashed line the threshold of response of coincidence detector 14 and the combined inputs by solid lines. As shown, detector 14 will provide an output to storage capacitor 22 corresponding to the differentiated pulse input to detector 14. The solid line in FIGURE 3i illustrates the combined inputs to detector 18. In this instance, however, as there is no coincidence, there is no signal above the dashed line threshold and no output is furnished by detector 18 to capacitor 26. Accordingly differential amplifier 24 will provide an output of a polarity coded to the particular input of differential amplifier 24 to which the output of capacitor 22 is applied. The output of differential amplifier 24 is applied to a control input of delay pulse generator "A" in the appropriate phase to cause the delay of generator "A" to increase to approach that of the delay introduced by generator "B."

Referring now to FIGURE 4 there is shown a graph plotting a typical output of amplifier 24 vs. pulse separation, with the separation, lead or lag, illustrated in both time and equivalent radar range. Due to the slope of the integrated inputs to coincidence detectors 14 and 18 (shown in FIGURES 3d and 3e), the error voltage output of differential amplifier 24 decreases as the pulses approach coincidence and is zero when coincidence is reached.

FIGURE 2 shows a schematic circuit diagram which generally follows the block diagram in FIGURE 1. Flip-flop 10 consists of two triode amplifiers 30 and 32, direct current coupled from plate to grid through resistor 34 and 36 paralleled by capacitors 38 and 40 and having a common cathode resistor 42. Anode power is applied to triode 30 through resistor 42 and to triode 32 through series resistors 44 and 46. Positive reference trigger pulses are applied through capacitor 48 across resistor 50 to the grid input of triode 32. Positive a pulses from generator "A" are applied through diode 54 across resistor 56, through capacitor 58, across resistor 60 to the grid input of triode 30. The flip-flop output is taken from triode 32 from the interconnection of anode resistors 44 and 46. This output, fed through coupling capacitor 62, is first clamped to a positive going maximum of ground potential by diode 64. It is then fed across resistor 65 to the grid input of triode 63 of coincidence detector 14 through resistor 66 and across capacitor 68. The R-C circuit of resistor 66 and capacitor 68 contribute the integrative effect causing the gradual rise of the leading edge of the waveform shown in FIGURE 3d. Diode 67 bridges resistor 66 and is poled to short resistor 66 during the period corresponding to the trailing edge of FIGURE 3d and thus provide the sharp drop indicated. A second output from capacitor 62 is differentiated by the combination of capacitor 70 and resistor 72. Only the differentiated leading, positive, edge of the differentiated waveform is retained, negative overshoot being bypassed by diode 74. The resulting differentiated pulse shown in FIGURE 3f, is applied to the grid of triode inverter amplifier 76 through resistor 78. This inverter amplifier includes triode 80, anode resistor 82 and cathode resistor 84 bypassed by capacitor 86. The negative pulse output of inverter 76 is fed through capacitor 88 across resistor 90a to the cathode of triode 63a of coincidence detector 18.

Elements in flip-flop 12, coincidence circuit 18, inverter 77 and rectifier circuit 93 bear the suffix *a* added to their counterpart reference numerals in flip-flop 10, coincidence circuit 14, inverter circuit 76 and rectifier 91 and function in the same manner. Due however to the initial difference in time position of the input pulse *b* (FIGURE 3a) to flip-flop 12, (compared with the position of pulse *a* applied to flip-flop 10), the leading edge of the output of flip-flop 12 (FIGURE 3c) which is triggered by pulse *b* is delayed with respect to the output of flip-flop 10 (FIGURE 3b).

In operation triode 63 of coincidence circuit 14 conducts when the negative output of inverter 77 applied to the cathode of triode 63 when added to the voltage impressed on the grid of triode 63 from flip-flop 10 is sufficient to exceed threshold bias. This is illustrated in FIGURE 3h, where the negative cathode pulse is represented as a positive grid pulse and the net grid voltage rises to exceed threshold. As shown, triode 63 will conduct a maximum amount during the period of the cathode pulse since the flat portion of the other input is adjusted to a threshold value and the cathode pulse is coincident with a flat portion. At the same time triode 63a will not conduct since there is no such coincidence. This is shown in FIGURE 3i.

Output pulses appearing across the output load resistor 92 for triode 63 are fed to rectifier circuit 91 through capacitor 94, resistor 96 across resistor 97 and diode 100. These pulses cause diode 100 to conduct and to partially discharge capacitor 22. In the absence of discharge pulses, capacitor 22 charges to the supply potential furnished by source 98 through resistor 99 across capacitor 101 and the voltage divider formed by resistors 96 and 104. Since there is no pulse output from triode 63a, a voltage unbalance exists between the voltages on capacitors 22 and 26 which are connected between the anodes of rectifiers 100 and 100a, respectively, and ground. This unbalance is applied to the inputs of cathode follower differential amplifier 24 by connection of the ungrounded terminal of capacitor 22 to the grid of triode 105 of amplifier 24 and the ungrounded terminal of capacitor 26 to the grid of triode 105a. The output of amplifier 24 appears across the ends of potentiometer 107 which are connected to the cathodes of triodes 105 and 105a. The center, or movable contact of potentiometer 107, is connected to the negative terminal of power source 109 through resistor 110. The exact point of coincidence, for zero output may be adjusted by adjusting the position of the movable contact of potentiometer 107. The output of amplifier 24 is fed back to generator "A" to control the pulse position of the output of generator "A" to achieve coincidence with the pulse output of generator "B" previously described.

While the foregoing is a description of the preferred embodiment, the following claims are intended to include those modifications and variations that are within the spirit and scope of my invention.

The following invention is claimed:

1. A pulse synchronization circuit for indicating the error in synchronization of first and second pulses, said pulses being produced in response to a trigger pulse and which pulses are delayed with respect to the trigger pulse, said circuit comprising first pulse forming means responsive to said first pulses and a trigger pulse for producing a pulse, the leading edge of which is coincident with the occurrence of a pulse output of the first pulse generating source and the trailing edge of which is coincident with said trigger pulse, second pulse forming means responsive to said pulses and said trigger pulse for producing a pulse, the leading edge of which is coincident with the occurrence of a pulse output of said second pulse generating source and the trailing edge of which is coincident with said trigger pulse, first integrating means responsive to a pulse output of said first pulse forming means for shaping the leading edge of said last named output to provide a gradually decreasing slope, second integrating means responsive to a pulse output of said second pulse forming means for shaping the leading edge of said last named pulse output to provide a gradually decreasing slope, first differentiating means responsive to the pulse output of said first pulse producing means for differentiating the leading edge of said last named pulse output, second differentiating means responsive to the pulse output of said second pulse producing means for differentiating the leading edge of said last named pulse output, first coincidence means responsive to the output of first integrating means and said second differentiating means for providing a first output when both inputs are present, second coincidence means responsive to said second integrating means and said first differentiating means for providing a second output when both inputs are present, third integrating means responsive to said first output for deriving a potential which is a function of the average value of said first output, fourth integrating means responsive to said second output for deriving a potential which is a function of the average value of said second output, differential means responsive to said third and fourth integrating means outputs for subtracting said outputs.

2. The circuit set forth in claim 1 further comprising a pulse system comprising trigger pulse means for providing said trigger pulses, first and second said generating means comprising means for providing said first and second pulses in response to said trigger pulse from said trigger pulse means, said first generating means including control means responsive to a signal for increasing the delay of pulse output in response to a signal of one polarity and decreasing the delay of pulse output in response to a signal of the opposite polarity, said control means being responsive to the output of said differential means.

No references cited.